(12) United States Patent
Brunn et al.

(10) Patent No.: US 9,426,160 B2
(45) Date of Patent: Aug. 23, 2016

(54) DELIVERING AUTHOR SPECIFIC CONTENT

(71) Applicant: International Business Machines Corporation, Armonk, NY (US)

(72) Inventors: Jonathan F. Brunn, Logan, UT (US); Jessica W. Forrester, Raleigh, NC (US); Stephen C. Hess, Durham, NC (US); Jeffrey R. Hoy, Southern Pines, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/557,882

(22) Filed: Dec. 2, 2014

(65) Prior Publication Data

US 2015/0089671 A1    Mar. 26, 2015

Related U.S. Application Data

(63) Continuation of application No. 14/075,611, filed on Nov. 8, 2013, which is a continuation of application No. 13/830,001, filed on Mar. 14, 2013, now Pat. No. 8,966,593.

(51) Int. Cl.
| | |
|---|---|
| *H04L 29/06* | (2006.01) |
| *G06F 17/30* | (2006.01) |
| *G06F 21/60* | (2013.01) |
| *H04L 29/08* | (2006.01) |
| *G06F 21/10* | (2013.01) |
| *G06F 21/64* | (2013.01) |

(52) U.S. Cl.
CPC .......... *H04L 63/10* (2013.01); *G06F 17/30386* (2013.01); *G06F 17/30864* (2013.01); *G06F 21/10* (2013.01); *G06F 21/60* (2013.01); *G06F 21/64* (2013.01); *H04L 63/08* (2013.01); *H04L 67/22* (2013.01); *H04L 67/306* (2013.01); *H04L 67/32* (2013.01)

(58) Field of Classification Search
CPC ......... H04L 67/22; H04L 67/32; H04L 67/10; H04L 63/08; G06F 21/10; G06F 21/64; G06F 17/30386; G06F 17/30864; G06F 21/60; G06F 67/306
USPC .......................................................... 726/28
See application file for complete search history.

(56) References Cited

U.S. PATENT DOCUMENTS

| | | | |
|---|---|---|---|
| 6,044,466 A * | 3/2000 | Anand | .................... G06F 9/468 726/1 |
| 2003/0163597 A1* | 8/2003 | Hellman | ........... G06F 17/30557 719/316 |

(Continued)

OTHER PUBLICATIONS

Simply Zesty, Full Service Digital Agency: The 10 Best News Aggregator Apps for Those on the Go, Sep. 2012, [online], http://www.simplyzesty.comlBlog/Articie/September-2012/The-10-Best-News-Aggregator-Apps-For-Those-On-The-Go, pp. 1-15.

(Continued)

*Primary Examiner* — Kambiz Zand
*Assistant Examiner* — Aubrey Wyszynski
(74) *Attorney, Agent, or Firm* — Steven L. Nichols; Fabian VanCott

(57) ABSTRACT

Delivering author specific content includes identifying author specific content with tags inserted into its metadata across multiple online resources and delivering updates about the author specific content to a user specified activity stream.

20 Claims, 6 Drawing Sheets

```
Identify author specific conduct with tags inserted into its
metadata across multiple online resources                      ~ 402

Deliver updates about the author specific content to a user
specified activity stream                                      ~ 404
```

(56) References Cited

U.S. PATENT DOCUMENTS

| | | |
|---|---|---|
| 2006/0161445 A1 | 7/2006 | Frank |
| 2009/0157491 A1 | 6/2009 | Brougher et al. |
| 2009/0209286 A1 | 8/2009 | Bentley et al. |
| 2009/0249451 A1* | 10/2009 | Su .................... G06F 17/30867 726/5 |
| 2010/0318925 A1 | 12/2010 | Sethi et al. |
| 2011/0093710 A1* | 4/2011 | Galvin ................. H04L 63/061 713/169 |
| 2013/0212109 A1 | 8/2013 | Evancich et al. |
| 2014/0122584 A1 | 5/2014 | Gargi et al. |
| 2014/0129345 A1 | 5/2014 | Grishaver |

OTHER PUBLICATIONS

West, J., Web Marketing Now, Search Engines Uncovered—Meta Author Tag Explained, May 6, 2011, [online], http://www.webmarketingnow.com/tips/meta-tags-meta-author.html, pp. 1-2.

* cited by examiner

DELIVERING AUTHOR SPECIFIC CONTENT

RELATED APPLICATIONS

The present application is a continuation of and claimed priority under 35 U.S.C. §120 to U.S. application Ser. No. 14/075,611, filed Nov. 8, 2013, entitled "DELIVERING AUTHOR SPECIFIC CONTENT," which is a continuation of U.S. application Ser. No. 13/830,001, filed Mar. 14, 2013, entitled "DELIVERING AUTHOR SPECIFIC CONTENT". These applications are incorporated herein by reference in their entirety.

BACKGROUND

The present invention relates to delivering author specific content, and more specifically, delivering author specific content to an activity stream customized to a user based on user input.

The ability of users to follow content from friends or other authors is tied to proprietary social networks. For example, a user can follow their friend on first social network application and can also follow the same friend on a second social network application. To follow what a friend is saying, the user checks both the first and second social networking applications. Some social media aggregation sites can combine updates from some social media applications to allow a user to follow content authored by friends from some specific social application at a centralized location. For example, the social media aggregation site can deliver the friend's comments from both the first and second social networking applications into a single activity stream that can be viewed by the user.

BRIEF SUMMARY

A method for delivering author specific content includes identifying author specific content with tags inserted into its metadata across multiple online resources and delivering updates about the author specific content to a user specified activity stream.

A system for delivering author specific content includes a crawling engine to crawl open content across multiple online resources, an identification engine to identify author specific content with tags inserted into metadata about the author specific content, and a delivery engine to deliver updates about the author specific content to an activity stream.

A computer program product for delivering author specific content includes a tangible computer readable storage medium, the tangible computer readable storage medium having computer readable program code embodied therewith, the computer readable program code having program instructions that, when executed, causes a processor to crawl open content across multiple online resources, identify author specific content with tags inserted into metadata about the author specific content, authenticate an author of the author specific content, and deliver updates about the author specific content to a user specified activity stream.

A method for delivering author specific content includes crawling open content across the multiple online resources, identifying author specific content with tags inserted into its metadata across multiple online resources, determining whether the author specific content is from an online resource that is trusted, authenticating an author of the author specific content if the online resource is not trusted, and delivering updates about the author specific content to a user specified activity stream.

A system for delivering author specific content includes a crawling engine to crawl open content across multiple online resources, an identification engine to identify author specific content with tags inserted into metadata about the author specific content, a trust engine to determine whether the author specific content is trusted content based on a trust policy, an authentication engine to authenticate an author of the author specific content if the author specific content fails to qualify as the trusted content according to the trust policy, a tracking engine to track the author and the author specific content in a database, an activity stream generation engine to generate the activity stream based on user input, and a delivery engine to deliver updates about the author specific content to an activity stream.

DETAILED DESCRIPTION

Figure 1:
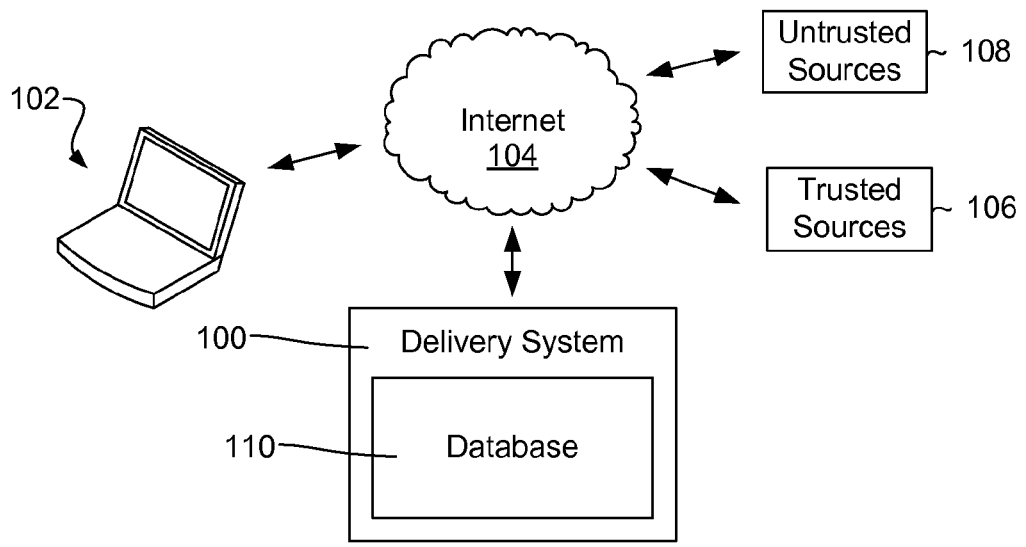
FIG. 1 is a diagram of an example of a delivery system according to one example of the principles described herein.

The present specification describes a method and system for delivering author specific content to an activity stream customized to a user based on user input.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

While social media aggregators can deliver a friend's content from social media applications, the aggregators are limited to delivering content from just specific social applications. A friend may author content outside of the specific social applications for which the aggregator is programmed for. As a result, the aggregator aggregates just some of the friend's content and if the user desires to view additional content authored by his friend, the user has got to seek out the non-aggregated content. The principles described herein include a method that allows a user to aggregate content from multiple online resources regardless of the website or program that the author used to post the content. The user does not have to be a member of a social application that the friend used to author the content, nor does the friend have to be aware that the user is following his content. The principles described herein include mechanisms for following content across any appropriate web based site, not just specific social applications.

Referring now to the figures, FIG. 1 is a diagram of an example of a delivery system (100). In this example, a client device (102) is in communication with the internet (104) which is in communication with trusted sources (106) and untrusted sources (108). The internet (104) is also in communication with the delivery system (100), which includes a database (110) of the authors and their associated content.

The client device (102) may be any appropriate device that allows the user to access information from the internet. For example, the client device may be a desktop, a laptop, a personal computer, a mobile device, a phone, an electronic tablet, another type of client device, or combinations thereof.

The user may access the delivery system (100) through the client device (102) over the internet. The user registers with the delivery system (100) and inputs the authors that the user would like to follow. In response, the delivery system (100) creates an activity stream specific for the user that delivers content generated by the author to the user. The user can access the content at a centralized online location, like a webpage provided by the delivery system (100). The author may be an individual, a corporation, an organization, a service, a web feed, a social networking application, a blog, another type of author, or combinations thereof.

The delivery system (100) uses a crawling engine to search the internet for content that appears to be generated by the author. Such a crawling engine can search for content from the trusted sources (106) and the untrusted sources (108). If the crawling engine discovers content that it believes was authored by the author, the delivery system (100) analyzes the metadata of the content and adds the information about the content to the database (110) along with the identification of the author.

If the online resource containing the author's content is from a trusted site, the delivery system (100) may not authenticate the content. For example, a website that causes its authors to register with the website and provide other information may be classified as a trusted source. As a result, the delivery system (100) may be confident enough that the authored generated content actually belongs to the author. The delivery system (100) may use a trust policy to determine whether an online resource is a trusted source. The trust policy may consider one or multiple factors when determining whether the delivery system has enough confidence that the content was authored by the author without authentication. For example, the trust policy may consider a uniform resource locator (URL) of an online resource containing the author specific content. Also, the trust policy may determine that the authorship of content is trusted if the content includes a digital signature. Further, the trust policy may consider whether an identity of the author is identified.

If discovered content comes from an online resource that the delivery system (100) does not automatically have a high degree of confidence in the content's authorship, the delivery system (100) causes the content to be authenticated. One mechanism to authenticate the content of untrusted sources includes using an identity provider, such as Open ID. Identity providers will be discussed in more detail below.

In some examples, the author also registers with the delivery system (100). In such examples, the delivery system (100) provides mechanisms to track the content that is authored by the author. For example, tags may be inserted into metadata in the content created by the author that is discovered by the crawling engine. In response to identifying such tags, the delivery system (100) stores the content, a link to the content, a summary of the content, a location of the content, other information about the content, or combinations thereof in the database (110) along with the identification of the author.

After registration, the user may find content online that he wishes to add to his activity stream. In such a situation, the user may activate a tool provided by the delivery system to select content on an online resource to be added to the activity stream. The delivery system can analyze the content, determine its author, and add the author to the database. In response to adding a new author to the activity stream and database, the crawling engine searches the open content of the internet to determine whether additional content generated by the newly added author exists. If so, the content of the newly added author is delivered to the user through the activity stream.

The crawling engine continues to monitor the internet for new content authored by the author specified by the user. The crawling engine also identifies updates to the content previously delivered to the user and delivers to the user the updates.

The principles described herein allow the user to follow authors through the delivery system at a centralized location. The user can follow the author regardless of whether the user is a member of the same social networking applications or other groups to which the author is posting information. Further, the user can follow the author without the author or the content site containing the author's content knowing that the author is being followed.

The delivery system (100) may deliver links to the author's content, a summary of the author's content, or the entirety of the author's content to the user. In some examples, the user has an option to select which format that the user wishes to receive the content. The delivery system delivers the content to the user in real-time as the content is found. The user may have an option to be notified about the content through email, text messages, auditory signals, posts on a webpage created by the delivery system dedicated to the user, voice mail, other mechanisms, or combinations thereof.

Figure 2:
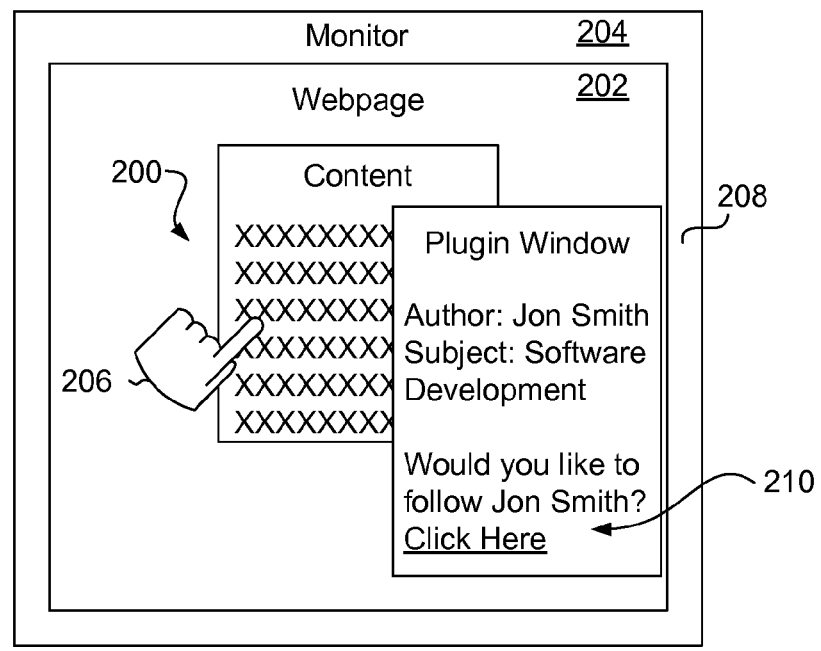
FIG. 2 is a diagram of an example of author content according to one example of the principles described herein.

FIG. 2 is a diagram of an example of author content (200). In this example, a webpage (202) of an online resource is displayed in a monitor (204) of a client device. A cursor (206) is used by the user to select content (200) of an author that the user wishes to follow.

In examples where the user is already registered with the delivery system, the delivery system provides a tool to allow the user to select content that he wants to follow. The content may be selected by highlighting the content with the cursor or through another selection mechanism. In this example, the tool provided by the delivery system includes a plugin application that produces a separate window (208) in response to the selection of content by the user. In other examples, the tool may include a bookmarklet, other mechanisms, or combinations thereof. In the example of FIG. 2, the separate window (208) identifies the author and the subject matter of the content (200). The window also provides a button (210) with the words "click here" that the user can activate if the user desires to follow the author.

In some examples, the delivery system gives the user an option to follow subject matter specific content produced by the author. For example, the user may want to follow Jon Smith, who is the author of the selected content in the example of FIG. 2. However, the user may want to follow just the content authored by Jon Smith that relates to program development. In such an example, if Jon Smith also creates content that deals with other subjects, such as Jon Smith's travels, the delivery system screens the content to deliver just content relating to program development to the user.

Figure 3:
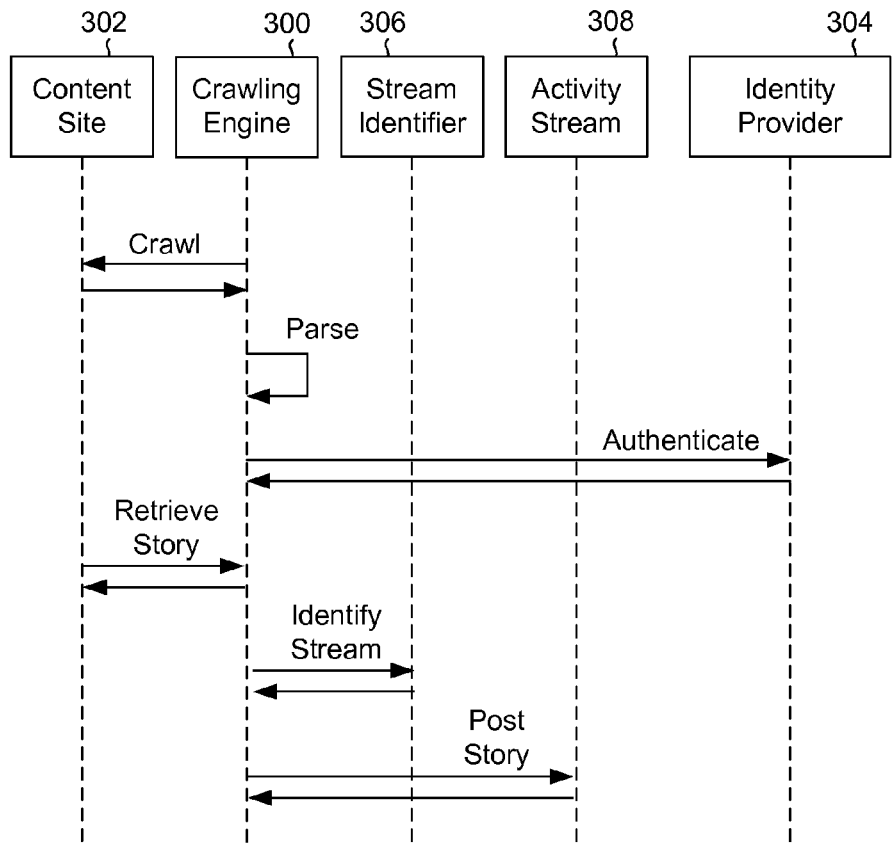
FIG. 3 is a diagram of an example of delivering author specific content according to one example of the principles described herein.

FIG. 3 is a diagram of an example of delivering author specific content. In this example, a crawling engine (300) gets content from the content site (302). The content site (302) may be a website, a social networking application, a blog, a web feed, another site that contains content, or combinations thereof. The content is any appropriate type of content that can be generated by an author such as a blog post, a comment to an online article, a news article or other article, a scholarly paper, an image, a photograph, another type of content, or combinations thereof The crawling engine (300) parses embedded microformats to identify the publishers, authors, topics, signers, summaries, other information about the content, or combinations thereof. For example, the crawling engine may analyze the metadata of the content to determine whether the content is signed, determine the authorship, determine the subject matter, determine other information about the content, or combinations thereof. While this example is described with reference to the crawling engine parsing the metadata of the content from the content site (302), any appropriate engine in the delivery system may perform the parsing function.

A microformat is a web based approach to semantic markup that uses existing hypertext markup language (HTML) or extensible hypertext markup language (XHTML) tags to convey metadata and other attributes about online content. A microformat allows programs to process information intended for the users automatically. The use of microformats enables data items to be indexed, searched for, saved, or cross-referenced, so that information can be reused or combined.

The crawling engine (300) determines the publisher and/or author of the content and determines whether the author and/or publisher already have information stored in the database.

If the content is not from a trusted site, the crawling engine (300) can check the authenticity of the author. In some examples, the content is signed by an author who is allegedly the author. In such situations, the crawling engine authenticates the signer. However, authentication may be skipped if the site's content generation is trusted. The crawling engine (300) may trust the publisher asserted by some sites without checking for the existence of a digital signature from an author. Further, the crawling engine (300) may trust the webpage based its domain suffix. In some examples, the crawling engine (300) uses an openid.identity tag, openid.sig tag, and openid.assoc_handle tag to issue a check_authentication request to an identity provider (304), such as OpenID. An identity provider (304) is an authentication system which uses security tags. OpenID is an open standard that authenticates users using a third party service. Users can create accounts with any OpenID identity providers and then use those accounts as the basis for signing on to any website that accepts OpenID authentication.

In one example, the crawling engine (300) generates an openid.signed tag, such as a digital signature, by requesting the content URL from the microformat and a special tag (signature=true) from the author's identity provider (304). For example, the digital signature may be http://example-.com/story/5c7bfbc0-5123-11e1-b86c-0800200c9a66?signature=true. The digital signature has a special relationship between the URL of the site containing the content and the identity provider's URL. As a result, the signature generated through the identity provider ensures the account owner of the identity provider created the content on the site. An additional content parameter may include a return_to URL command that ensures that the content presented on the content site matches the content originally created.

The crawling engine (300) also requests the URL specified in the content site's microformat to use the body of the post. The content URL may respond with a JavaScript Object Notation (JSON) formatted description of the content in the activity stream standard, HTML, plaintext, another format understood by the user's streams, or combinations thereof.

The crawling engine (300) determines which user has requested to follow the appropriate author from the stream identifier (306). If the content URL was a JSON formatted description, the crawler also extracts topics and summary identifiers. The crawling engine (300) posts the topics and summary identifiers to the appropriate activity stream (308) through an application interface supported by the stream.

Figure 4:
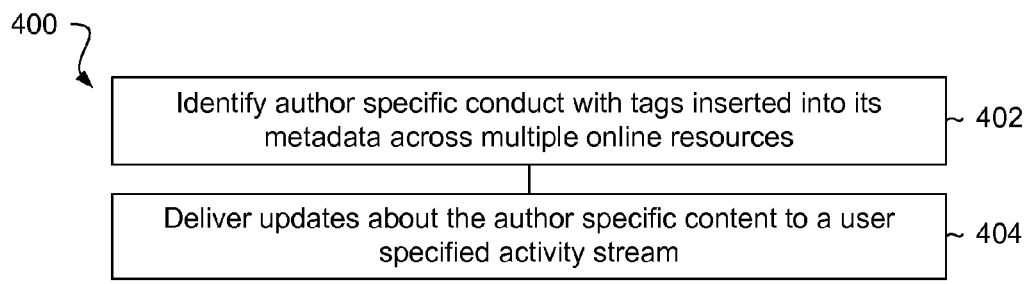
FIG. 4 is a diagram of an example of a method for delivering author specific content according to one example of the principles described herein.

FIG. 4 is a diagram of an example of a method (400) for delivering author specific content. In this example, the method (400) includes identifying (402) author specific conduct with tags inserted into its metadata across multiple online resources and delivering (404) updates about the author specific content to a user specific activity stream.

The author may be an individual, a corporation, an organization, a service, a web feed, a social networking application, a blog, another type of author, or combinations thereof. The method may be implemented with a delivery system that maintains a database that tracks and stores information such as the author, the author's content, summaries of the author's content, the location of the author's content, other information, or combinations thereof.

To discover the author's content, a crawling engine crawls open content across multiple online resources. The crawling engine looks for indicators of the author's content. Such indicators may include digital signatures, metadata, tags inserted into metadata, other indicators, or combinations thereof. In some instances, the crawling engine searches for just signed specific content, which is content that is pre-authenticated.

The method may also include authenticating author specific content. For example, such authentication may include using a digital signature to authenticate the author. Authenticating the author credited to generating author specific content may occur with the content from an untrusted website. In other examples, if the content is from a trusted resource, authentication tasks may be skipped.

The delivery system may determine whether the author content is a trusted or untrusted content based on a trust policy. The trust policy may consider factors such as a uniform resource locator (URL) of the online resource containing the author specific content, a digital signature from the author of the author specific content, whether an identity of the author is identified for the author content, other factors, or combinations thereof.

The delivery system continues to monitor the online content of the author(s) indicated by the user, such that updates and other changes to the content are delivered to the user in real time. The delivery system can use any appropriate mechanism for delivering the author specific content to the user. For example, the user may have a webpage provided by the delivery system to which the delivery system posts the content, links to the content, summaries of the content, other information about the content for the user's convenience. In other examples, the activity stream may include email messages, instant messages, text messages, auditory messages, notification messages, other types of messages, or combinations thereof. The activity stream can be customized to the user based on the user's input. The delivery system may deliver the content and/or its information through a social networking site or other site indicated by the user. Other such customization may include frequency of messages, delivery type options, which author or authors to follow, the subject matter of specific authors to follow, other options, or combinations thereof.

The principles described herein allow a user to follow topics and authors across the internet and intranets, not just select sites. The delivery system does this without the sites having to be aware of the social network used by the user. As long as content authors are registered with the delivery system, the users may follow content authors, publishers, and individual summaries of content and/or topics without the knowledge of the content authors.

Further, the user can follow content authors and publishers without belonging to the same social network to which the content is posted. Also, the users may follow content authors, publishers and sites without the authors, publishers, or sites being aware of the social network used by the user to follow them. Nor are the authors, publishers, or sites necessarily aware of the user's account with the delivery system.

As will be described in more detail below, content producers and web applications may integrate with a social network without opening new application programming interface endpoints specifically for activity streams. The content producers may slightly modify the markup of their pages to enable the delivery system to work with their sites. Thus, the principles described herein make it easier to instrument existing content management systems and applications to contribute content or summaries of the content to the activity streams simply by modifying the markup of their pages.

Figure 5:
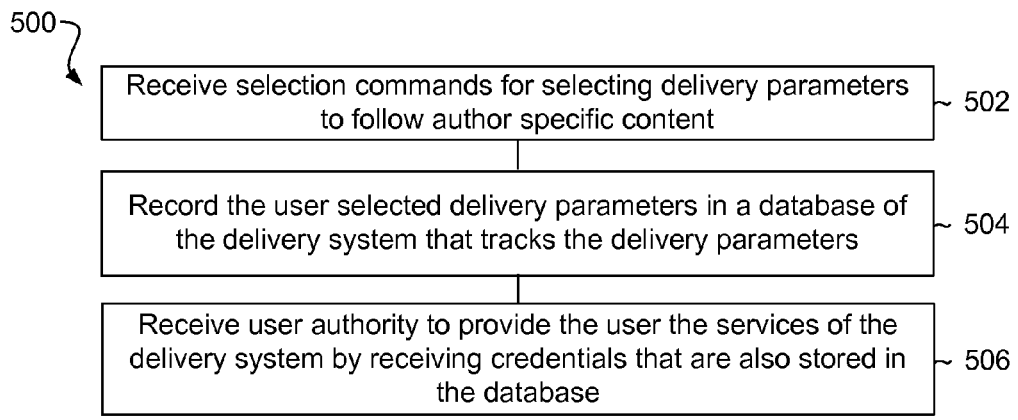
FIG. 5 is a diagram of an example of a method for registering a user for delivery of author specific content according to one example of the principles described herein.

FIG. 5 is a diagram of an example of a method (500) for registering a user for delivery of author specific content. In this example, the method (500) includes receiving (502) selection commands for selecting delivery parameters to follow author specific content, recording (504) the user selected delivery parameters in a database of the delivery system that tracks the delivery parameters, and receiving (506) user authority to provide the user the services of the delivery system by receiving credentials that are also stored in the database.

The delivery parameters can include which author to follow, how many authors to follow, where to deliver the content or content information, other parameters, or combinations thereof. The delivery parameters may include selection of a stream service. A stream service may be a social networking site, email, texting mechanism, other stream service, or combinations thereof. The user may identify the stream service by inputting the stream service's URL.

Recording the delivery parameters may occur automatically with a script or server process. For example, such recording may take place as part of an employee on-boarding process. The credentials provided by the user may include a tag such as a token, another type of credential, or combinations thereof. In some examples, the tag may be provided with OAuth, which is an open standard for authorization. OAuth provides a method for users to authorize third-party access to their server resources without sharing their credentials.

Figure 6:
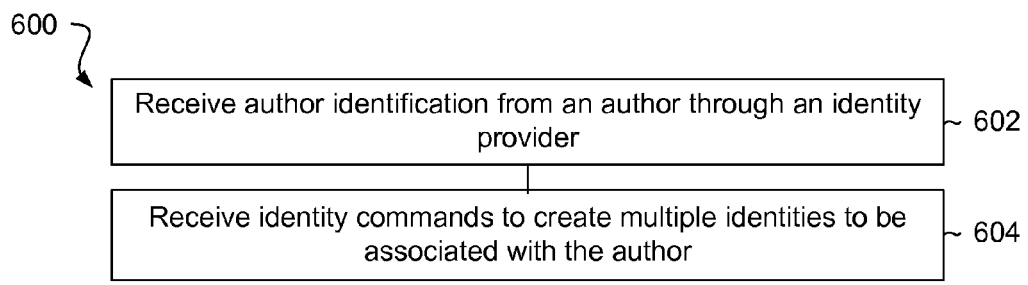
FIG. 6 is a diagram of an example of a method for registering an author with a delivery system according to one example of the principles described herein.

FIG. 6 is a diagram of an example of a method (600) for registering an author with a delivery system. In this example, the method (600) includes receiving (602) author identification from an author through an identity provider and receiving (604) identity commands to create multiple identities to be associated with the author.

The author's registration with the delivery system occurs in some examples. If the author does not expressly create an account with the delivery system, the delivery system will create an account for the author upon discovering the author with the crawling engine.

If the author decides to register with the delivery system, the author can create multiple identities that identify the author. For example, the author may create an identity for posts that he contributes to a particular blog and another identity for articles that he writes for an online newspaper. Both identities will be associated with the author. For users wishing to follow the author, the delivery system identifies the various identities created by the author and delivers the content or information about the content to the user's customized activity stream.

Figure 7:
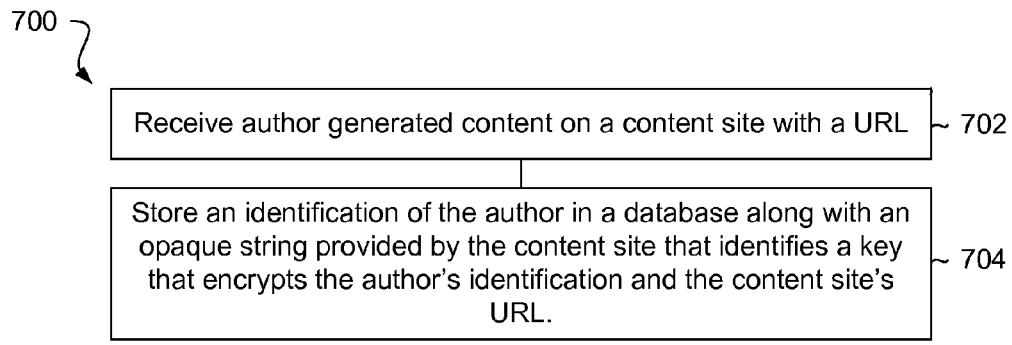
FIG. 7 is a diagram of an example of publishing author content according to one example of the principles described herein.

FIG. 7 is a diagram of an example of a method (700) for publishing author content according to one example of the principles described herein. In this example, the method (700) includes receiving (702) author generated content on a content site identified with a URL and storing (704) an identification of the author in a database along with an opaque string provided by the content site that identifies a key that encrypts the author's identification and the content site's URL. Alternatively, the content site can also store in its metadata the author's identification, association information, authorization information, and other information relevant to the delivery system.

The content site or author can generate metadata that is to be published as a summary of the author generated content on the content site. If the content site is the identity provider, the content site may use any appropriate mechanism to generate an identification signature. The publisher's metadata generates and stores an opaque string used to identify a cryptographic key. The opaque string is also stored in a database row along with the cryptographic key and the author's identity. The content site uses the cryptographic key to encrypt the mode and identity. The cryptographic key also encodes the URL specific to the content summary with additional authentication parameters. The content site also includes a microformat that includes a signature, the opaque string, an author identification with the content summary, and a content URL in the content site's final markup.

Figure 8:
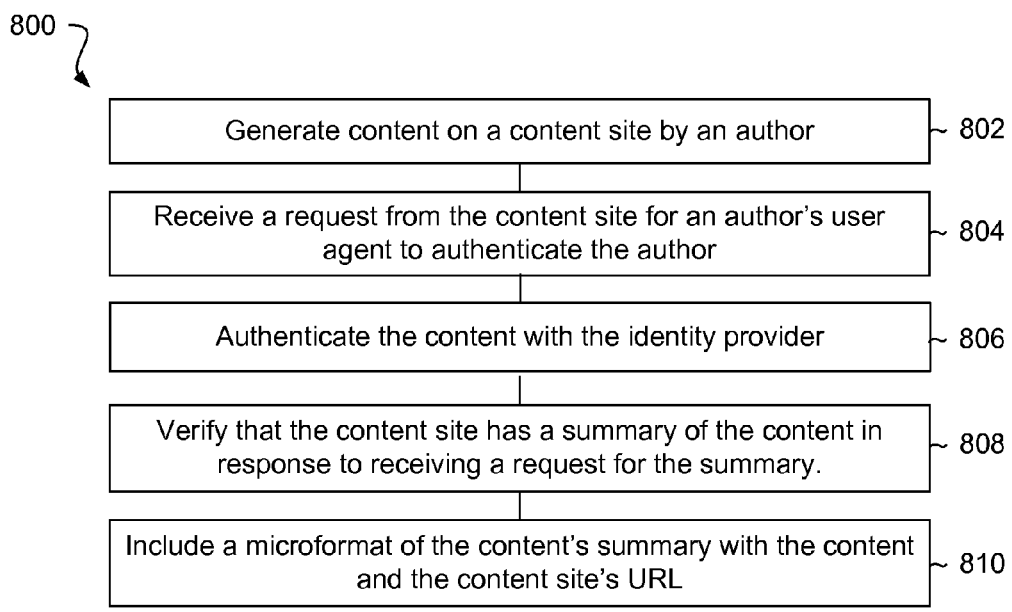
FIG. 8 is a diagram of another example of a method for publishing author content according to one example of the principles described herein.

FIG. 8 is a diagram of another example of a method (800) for publishing author content. In this example, the method (800) includes generating (802) content on a content site by an author, receiving (804) a request from the content site for an author's user agent to authenticate the author, authenticating (806) the content with the identity provider, verifying (808) that the content site has a summary of the content in response to receiving a request for the summary, and including (810) a mircoformat of the content's summary with the content and the content site's URL.

The content site directs the content author's user agent, which is an identity provider, to request authentication of the author. The identity provider may use an additional tag, such as openid.return_to URL, per the identity provider's mode of operation. The return_to URL can contain the same information as the content URL, but with an additional tag. The additional tag allows the content site, upon return from the identity provider, to distinguish the return from a request for the content while preserving a one to one relationship between the content URL and return URL. The return URL can be used by the crawling engine to verify the content's author. For instance, if the content URL is http://example-.com/story/5c7bfbc0-5123-11e1-b86c-0800200c9a66, then the return_to URL would be http://example.com/story/5c7bfbc0-5123-11e1-b86c-0800200c9a66?signature=true.

The identity provider authenticates the content, provides the return URL with signed tags, such as openid.mode, openid.identity, openid.return to, and an openid.assoc_handle, and returns the user agent to the return URL. As a result, the content author is established as having created something at the same site being crawled. The delivery system trusts that the content site will not change the author's content. To ensure the content site doesn't change the content while leaving the content URL the same, part of the content may be embedded in the return_to URL and be presented to the content author when signing into the identity provider. The identity provider may digitally sign as part of the return_to URL.

Upon receipt of a request for the content URL with the additional tag and other parameters added by the identity provider, the content site checks that the session belongs to the content site. If so, the publisher determines that the author is attempting to sign his work and stores the openid.sig tag and opaque string with the content in the database. Alternatively, the content site may automatically generate a summary microformat using these fields and generate a page with the embedded content summary.

The content site creates a microformat that includes the author identity, opaque string, and signature with the content and the content URL (rel=story) in the final website markup generated for this piece of content. A summary link may be omitted in the microformat. In such an example, the content URL used for authentication is the URL of the page being crawled. In another example, the content site and summary information are added as additional properties or types within the Open Graph protocol.

Figure 9:
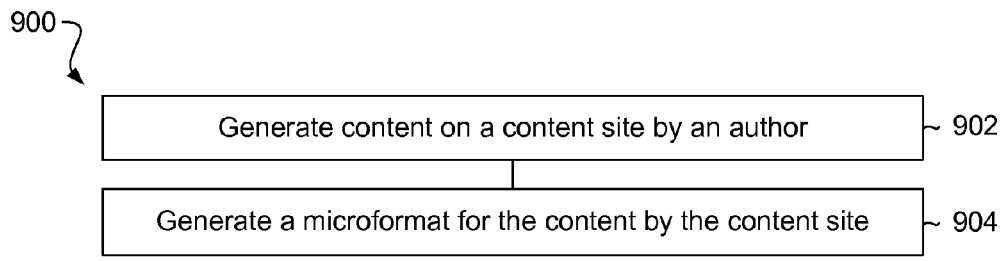
FIG. 9 is a diagram of another example of a method for publishing author content according to one example of the principles described herein.

FIG. 9 is a diagram of another example of a method (900) for publishing author content where no signatures are involved. In this example, the method (900) includes generating (902) content on a content site by an author and generating (904) a microformat for the content by the content site. Such a method may be used when no signature is included in the microformat. The microformat may include the content and the content URL in the final website markup.

Figure 10:
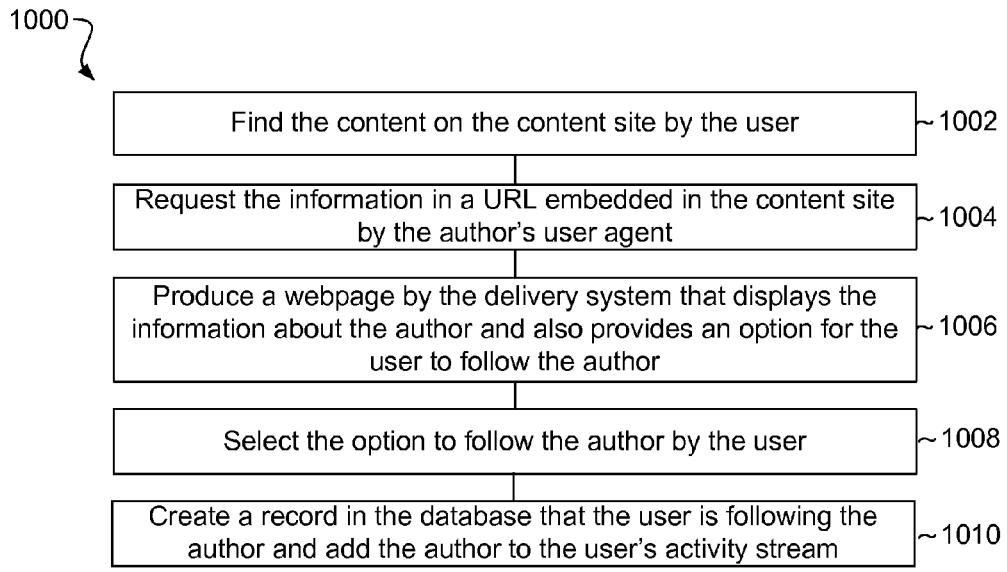
FIG. 10 is a diagram of an example of a method for following an author according to one example of the principles described herein.

FIG. 10 is a diagram of an example of a method (1000) for following an author with an embedded user interface. In this example, the method (1000) includes finding (1002) the content on the content site by the user, requesting (1004) the information in a URL embedded in the content site's by the author's user agent, producing (1006) a webpage by the delivery system that displays the information about the author and also provides an option for the user to follow the author, selecting (1008) the option to follow the author by the user, and creating (1010) a record in the database that the user is following the author and add the author to the user's activity stream.

The principles described herein include the use of a user interface that can be embedded by the author's content, the content summary application, a web interface, another mechanism, or combinations thereof. The content site includes a URL to the delivery system with additional parameters identifying the content publisher or author. In examples where the embedded user interface is an iframe, the iframe can direct the use to an URL such as the following: http(s)://example.com/?author=jane.openid.example.com".

When the user agent requests the content of the URL in this iframe, the delivery system queries the identity provider to retrieve information about the user. The delivery system includes a server based application which produces a page at the URL that displays information about the author to be followed and displays a button that, if selected, causes the user to follow the author. The button submits to the delivery system and causes the creation of a record that the user is following the author.

Figure 11:
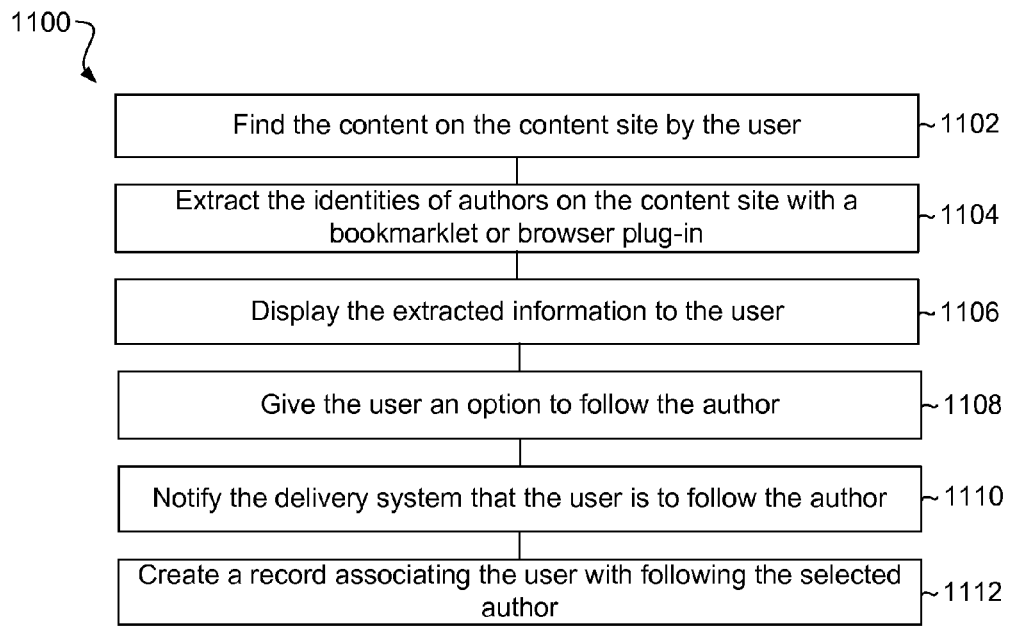
FIG. 11 is a diagram of an example of a method for following an author according to one example of the principles described herein.

FIG. 11 is a diagram of an example of a method (1100) for following an author. In this example, the method (1100) includes finding (1102) the content on the content site by the user, extracting (1104) the identities of authors on the content site with a bookmarlet or browser plugin, displaying (1106) the extracted information to the user, giving (1108) the user an option to follow the author, notifying (1110) the delivery system that the user is to follow the author, and creating (1112) a record associating the user with following the selected author.

The bookmarklet may be an unobtrusive script written in JavaScript and stored as the URL of a bookmark in web browser or as a hyperlink on a webpage. The user may install a bookmarklet and browser plugin to be included as part of a browser application. The content site may produce content summaries while being unaware of the activity stream to which the user is using to follow them.

If the user is using a bookmarklet, the user clicks to the bookmarklet to follow the author. On the other hand, if the user is using a browser plugin, the browser plugin automatically parses the page looking for identities that the user is following from the microformats on the content site. The bookmarklet or browser plugin extracts the identity provider of any authors on the page and calls the identity provider to display information about the author to be followed. The user may select to follow any of the authors identified on the page. The bookmarklet or browser plugin makes a remote call to the delivery system by sending information that a particular user is following a particular identity provider account. An application on the delivery system creates a record that a particular user is following a particular author by the author's identity provider account.

Figure 12:
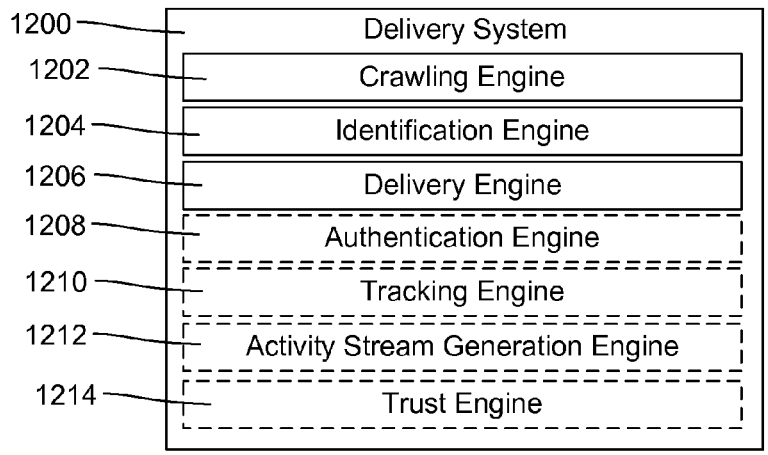
FIG. 12 is a diagram of an example of a delivery system according to one example of the principles described herein.

FIG. 12 is a diagram of an example of a delivery system (1200). The delivery system (1200) includes a crawling engine (1202), an identification engine (1204), and a delivery engine (1206). In the example of FIG. 12, the delivery system (1200) also includes an authentication engine (1208), a tracking engine (1210), an activity stream generation engine (1212), and a trust engine (1214). The engines (1202, 1204, 1206, 1208, 1210, 1212, 1214) refer to a combination of hardware and program instructions to perform a designated function. Each of the engines (1202, 1204, 1206, 1208, 1210, 1212, 1214) may include a processor and memory. The program instructions are stored in the memory and cause the processor to execute the designated function of the engine.

The crawling engine (1202) crawls open content on internets, intranets, and other online resources searching for author specific content. The identification engine (1204) identifies the author specific content and the delivery engine (1206) delivers the author specific content to the user. The authentication engine (1208) authenticates the content to ensure that the content was really authored by who is alleged to have authored the content. The tracking engine (1210) tracks the users, authors, the author specific content, and relevant information about the author and users in a database for retrieval. The activity stream generation engine (1212) generates an activity stream for the user based on the user's input. Further, the trust engine (1214) determines whether the content and/or site to where the content is published is to be trusted.

FIG. 8 is a diagram of an example of a delivery (1300) according to principles described herein. In this example, the delivery system (1300) includes processing resources (1302) that are in communication with memory resources (1304). Processing resources (1302) include at least one processor and other resources used to process programmed instructions. The memory resources (1304) represent generally any memory capable of storing data such as programmed instructions or data structures used by the delivery system (1300). The programmed instructions shown stored in the memory resources (1304) include a user input receiver (1306), a user stream generator (1308), an open content crawler (1310), a metadata crawler (1312), an author/content uploader (1314), a tag generator (1316), a tag inserter (1318), a trust determiner (1322), an authenticator (1326), a content summary retriever (1328), a stream identifier (1330), and a content summary poster (1332). The data structures shown stored in the memory resources (1304) include an author/content database (1316) and a trust policy (1324).

The memory resources (1304) include a computer readable storage medium that contains computer readable program code to cause tasks to be executed by the processing resources (1302). The computer readable storage medium is a tangible. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, or types of memory, or combinations thereof.

The user input receiver (1306) represents programmed instructions that, when executed, cause the processing resources (1302) to receive input from a user about the parameters for following authors when registering with the delivery system. The user stream generator (1308) represents programmed instructions that, when executed, cause the processing resources (1302) to generate a user activity stream based on the user's input.

The open content crawler (1310) represents programmed instructions that, when executed, cause the processing resources (1302) to crawl open content across multiple online resources to discover author specific content. The metadata analyzer (1312) represents programmed instructions that, when executed, cause the processing resources (1302) to analyze metadata of the author specific content. The author/content uploader (1314) represents programmed instructions that, when executed, cause the processing resources (1302) to upload the author, content, and relevant information about the content to the author/content database (1316) in response to discovering author content online. The tag generator (1318) represents programmed instructions that, when executed, cause the processing resources (1302) to generate a tag for insertion to database, the content, or the website containing the content to identify the author and the content. The tag inserter (1320) represents programmed instructions that, when executed, cause the processing resources (1302) to insert the tags appropriately.

The trust determiner (1322) represents programmed instructions that, when executed, cause the processing resources (1302) to determine whether the content or the online resource containing the content is a trusted source according to the rules stored in the trust policy (1324). The authenticator (1326) represents programmed instructions that, when executed, cause the processing resources (1302) to authenticate the content and/or the author if the online resource is determined to be untrusted.

The content summary retriever (1328) represents programmed instructions that, when executed, cause the processing resources (1302) to retrieve the content summaries from the publishing website. The stream identifier (1330) represents programmed instructions that, when executed, cause the processing resources (1302) to identify the appropriate activity stream to post the retrieved summary. The content summary poster (1332) represents programmed instructions that, when executed, cause the processing resources (1302) to post the content summary to the selected activity stream.

Further, the memory resources (1304) may be part of an installation package. In response to installing the installation package, the programmed instructions of the memory resources (1304) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (1302) and the memory resources (1304) are located within the same physical component, such as a server, or a network component. The memory resources (1304) may be part of the physical component's main memory, caches, registers, non-volatile memory, or elsewhere in the physical component's memory hierarchy. Alternatively, the memory resources (1304) may be in communication with the processing resources (1302) over a network. Further, the data structures, such as the libraries and may be accessed from a remote location over a network connection while the programmed instructions are located locally. Thus, the delivery system (1300) may be implemented on a user device, on a server, on a collection of servers, or combinations thereof.

Figure 13:
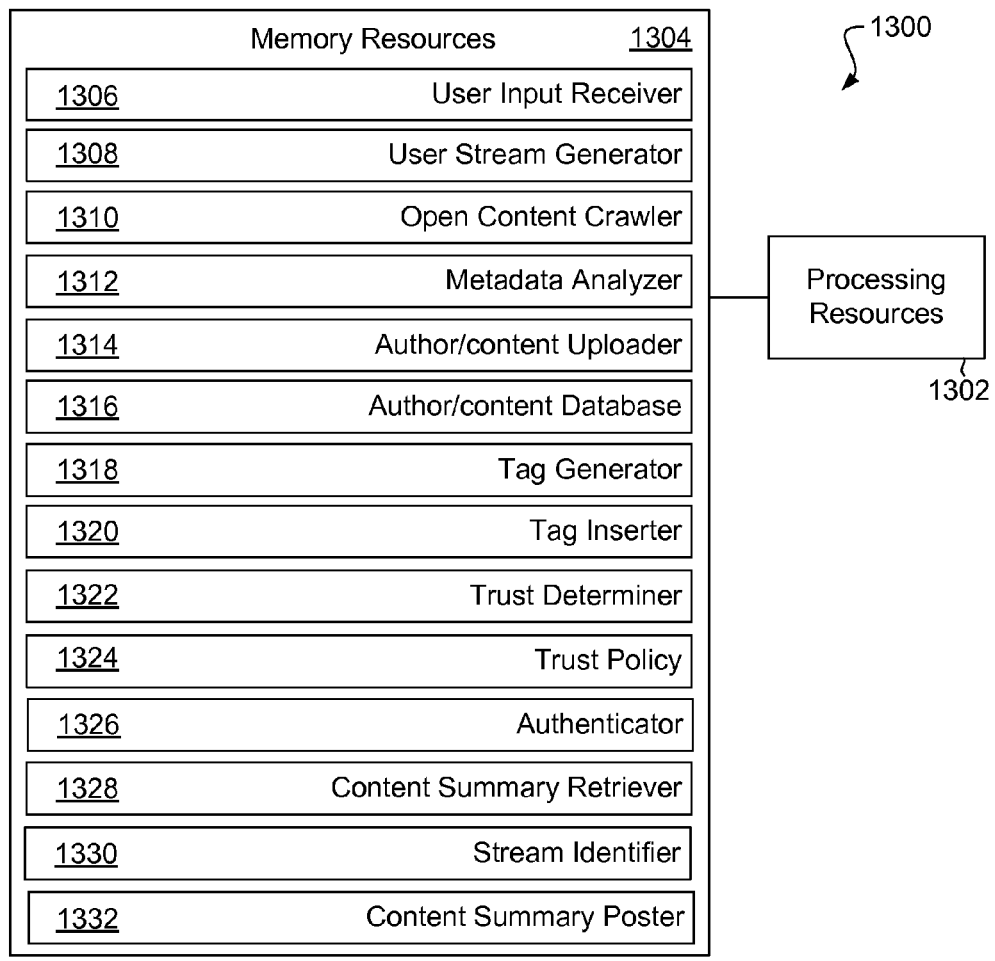
FIG. 13 is a diagram of an example of a delivery system according to one example of the principles described herein.

The delivery system (1300) of FIG. 13 may be part of a general purpose computer. However, in alternative examples, the delivery system (1300) is part of an application specific integrated circuit.

While the examples above have been described with reference to specific mechanisms for registering a user and/or an author with the delivery system, any appropriate mechanism for registering the users and/or authors with the delivery system may be used in accordance with the principles described herein. Further, while the examples above have been described with reference to specific mechanisms for publishing the author's content to a content site, any appropriate mechanisms for publishing the author's content to the content site may be used in accordance with the principles described herein. Also, while the examples above have been described with specific mechanisms that allow a user to follow an author, any appropriate mechanisms that allow an author to follow an author may be used in accordance with the principles described herein.

While the examples above have been described with reference to specific mechanisms for crawling a content site, any appropriate mechanisms for crawling a content site may be used in accordance with the principles described herein. Further, while the examples above have been described with reference to specific mechanisms for identifying authors, any appropriate mechanisms for identifying authors may be used in accordance with the principles described herein. Also, while the examples above have been described with reference to specific delivery mechanisms, any appropriate delivery mechanisms may be used in accordance with the principles described herein.

While the examples above have been described with reference to specific mechanisms for authenticating content, any appropriate mechanisms for authenticating content may be used in accordance with the principles described herein. Further, while the examples above have been described with reference to specific trust policies, any appropriate trust policy may be used in accordance with the principles described herein.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A method of generating a database of verified authors and associated content, the method comprising:
   receiving input from a user identifying content on webpage;
   identifying purported author of that content;
   if according to a trust policy, the site is trusted, then associating the identity of the purported author with the user in a database; and
   if, according to a trust policy, the site is not trusted, then using a verification engine to verify the identity of the author of the content, and if the verification engine verifies the identity of the author, then associating the verified author with the user in the database to produce a list of authors whose content has been selected by the user.

2. The method of claim 1, further comprising:
   engaging a crawler to search content for content apparently authored an author in the database associated with the user; and for found content, if it the source is trusted according to a trust policy, indexing the found content into the database by author in the database; and for found content, if the source is not trusted according to a trust policy, verifying the identity of the purported author of the found content, in which if the author of the found content is verified, indexing the found content into the database by author in the database.

3. The method of claim 2, in which the searched content includes non-public content.

4. The method of claim 2, further comprising delivering to the user the indexed found content based on the content being added to the database.

5. The method of claim 2, further comprising:
monitoring the indexed found content for updates; and
notifying the user when indexed found content is updated.

6. The method of claim 2 further comprising:
categorizing the indexed found content; and
selectively providing the indexed found content to user based on category.

7. The method of claim 6, in which the author is able to exclude content based on category from provision to the user.

8. The method of claim 2, further comprising:
comparing the indexed found content with content already associated with the author in the database;
determining based on the comparison whether the indexed found content is already included in the database; and
if the indexed found content is already included in the database, not providing the indexed found content to the user.

9. A method of identifying authorship of content, the method comprising:
receiving input from a user associated with a content;
determining the purported author of the content;
verifying the purported author of the content; and
informing the user of the verified author of the content.

10. The method of claim 9, further comprising:
prompting the user regarding following the verified author; and
receiving user input regarding following the verified author.

11. The method of claim 10, further comprising aggregating verified content and trusted content authored by the verified author from a plurality of sources.

12. The method of claim 10, in Which the verified author is a plurality of verified authors and the method further comprising prompting the user for which of the plurality of verified authors the user wishes to follow.

13. The method of claim 9, further comprising categorizing the found content.

14. The method of claim 9, further comprising providing an author information associated with users in the database.

15. The method of claim 9, further comprising providing a user information associated with other users in the database.

16. The method of claim 9, in which no information about users is available to an author from the database.

17. A method of identifying content purportedly authored by an identified author, the method comprising:
engaging a crawler to search content for content apparently authored with an identified author, including searching non-public content using access rights provided by a user; and
for found content, if it the source is trusted according to a trust policy, index the found content into a database by the identified author; and
for found content, if the source is not trusted according to a trust policy, verify the identity of the purported author of the found content and if the author of the found content is verified, index the found content in a database by the identified author; and
referencing an indexed non-public content associated with the identified author to users with access rights to the associated non-public content.

18. The method of claim 17, further comprising disclosing existence but not content of indexed non-public content to a second user without access rights to the non-public content.

19. The method of claim 17, in which content with an identifier is excluded from user access without a token.

20. The method of claim 17, in which a content stream provided to a user includes material on an author identified by an activity stream content engine as similar to an identified author selected by a user.

* * * * *